United States Patent [19]

Black et al.

[11] 3,868,319

[45] Feb. 25, 1975

[54] METHOD AND APPARATUS FOR REMOVING OIL FROM SWIMMING POOLS

[76] Inventors: Gerall A. Black, 7532 Oakland Ave. South, Minneapolis, Minn. 55423; Edward C. Straub, 9007 W. 70th St., Merriam, Kans. 66204

[22] Filed: Oct. 23, 1973

[21] Appl. No.: 408,860

[52] U.S. Cl............ 210/40, 210/DIG. 21, 210/169, 210/242
[51] Int. Cl............................................ B01d 15/00
[58] Field of Search........... 210/169, 39, 40, 41, 65, 210/84, 167, 195, 196, 197, 242, DIG. 21; 4/172.16–172.21

[56] References Cited
UNITED STATES PATENTS

| | | | |
|---|---|---|---|
| 3,143,499 | 8/1964 | Miller | 210/169 |
| 3,249,228 | 5/1966 | Arranitakis | 210/167 X |
| 3,426,902 | 2/1969 | Kilpert et al. | 210/DIG. 21 |
| 3,630,891 | 12/1971 | Peterson et al. | 210/DIG. 21 |
| 3,669,275 | 6/1972 | Downs | 210/DIG. 21 |
| 3,679,058 | 7/1972 | Smith | 210/DIG. 21 |
| 3,744,257 | 7/1973 | Spanner | 210/DIG. 21 |
| 3,770,626 | 11/1973 | Ayers | 210/DIG. 21 |

*Primary Examiner*—Theodore A. Granger
*Attorney, Agent, or Firm*—Merchant, Gould, Smith & Edell

[57] ABSTRACT

A method and apparatus for removing an oil film from the surface of the water in a swimming pool by placing material that is preferentially absorptive of the oil in the system in which the pool water is circulated so that the oil is absorbed by the material as the material is contacted by the water during the course of its circulation.

4 Claims, 2 Drawing Figures

PATENTED FEB 25 1975 3,868,319

METHOD AND APPARATUS FOR REMOVING OIL FROM SWIMMING POOLS

BACKGROUND OF THE INVENTION

Swimming pool operators and owners have had considerable difficulty removing the oil film that often appears on the surface of the water. Many of the persons using the pools are covered with suntan oil or the like which gets washed off into the pool. Especially in crowded public and commercial pools and also in private pools this quickly forms a film of oil on the surface of the water. If nothing is done, the oil eventually forms a scum on the sidewalls of the pool and fouls up the filters and the pumps of the circulation system associated with the pool. At present there is no convenient, commercially available method of removing this oil from swimming pools.

A material which preferentially absorbs oil and is used to soak up spills is described in U.S. Pat. No. 3,630,891 (Peterson, et al.), the teachings of which are incorporated herein by reference. The material is commercially available in the form of felted, fibrous sheets or pads treated with a water repellant sizing material, which is used to remove oil floating on the surface of water by preferentially absorbing the oil. Pads of this material have been used in the conventional way to try and soak up the oil film on the surface of swimming pools, but without much success. The oil film is very thin and tends to simply push out from under the pads. It was then discovered that if the absorbent material is used in an unconventional, new way, the oil film can be quickly and conveniently removed.

SUMMARY OF THE INVENTION

Swimming pools are normally provided with one or more surface skimmers (sometimes referred to as "strainers"), for the removal of debris such as leaves, etc., from the surface of the pool. Water is pumped from the pool at a constant rate and overflows a weir into the skimmer where the debris is collected in a perforated skimmer basket. After being strained, the water may be filtered, treated, heated, etc., in the circulation system downstream from the surface skimmer. After this the water is returned to the pool.

The present invention involves placing small pads or scraps of material that are preferentially absorptive of oil into the skimmer baskets so that the water overflowing from the pool comes in contact with the material. It is not necessary to completely line the inside of the baskets or to completely filter the water flowing through the baskets. It is sufficient if the pads or scraps of absorbent material are simply dropped into the tops of the baskets so that they are free to move about in and be contacted by the water from the surface of the pool passing therethrough.

This simple, convenient technique is surprisingly effective in removing oil from the pool surface. The oil simply overflows with the water and is absorbed by the absorbent material as it comes in contact therewith. As the pads of absorbent material become saturated with oil they are replaced or squeezed out and reused.

DESCRIPTION OF THE PREFERRED METHOD

Figure 1:
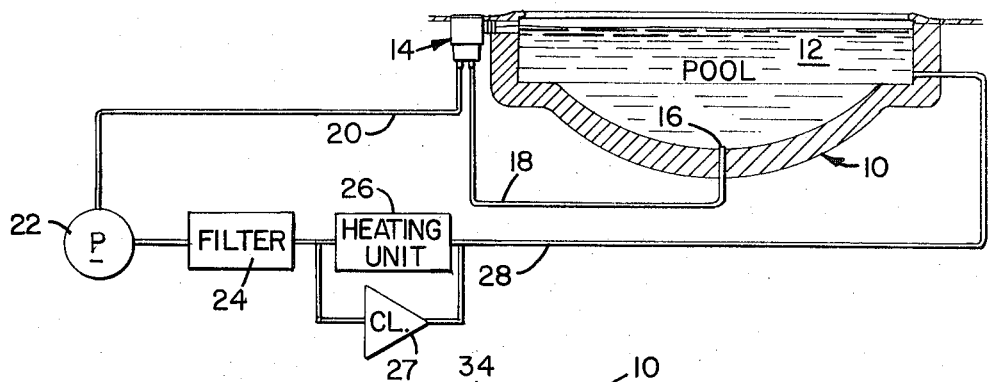
FIG. 1 is a cross section view of a pool and the associated system for circulating the water in the pool.

Referring to FIG. 1, a swimming pool tank contains a body of water 12. The surface of the water overflows through an entrance passageway into a skimmer 14 which strains out debris such as leaves, bugs, etc., on the surface of the pool. The water from the pool also flows out a main drain 16 at the bottom and through a pipe 18 to the bottom of skimmer 14. The water flowing down through skimmer 14 and the water flowing through pipe 18 into the bottom of skimmer 14 combine and flow out the bottom of skimmer 14 through a pipe 20. The other end of pipe 20 is connected to the inlet of a pump 22, the outlet of which is connected to a filter 24. After being pumped through filter 24, which removes fine particles from the water, the water passes through a heating unit 26 and is transported through a pipe 28 back to pool 10 at a point terminating in a side wall of the swimming pool at a point about halfway up from the bottom. Some of the water is treated in a chlorinator unit 27 which bypasses heating unit 26. In this way the water is continually circulated from the top surface and bottom of the pool and back again.

The pool of FIG. 1 is but an example. Some pools do not have main drains, e.g., vinyl-lined pools, above-ground pools, etc., and all water is drawn off the surface ("skimmed"). In pools of the type of FIG. 1 about 30% of the water pumped comes from the main drain and about 70% from the skimmer. The skimmer may contribute from 50% to 100% (100% if there is no main drain). Some pools may have the skimmer and main drain on separate lines.

Figure 2:
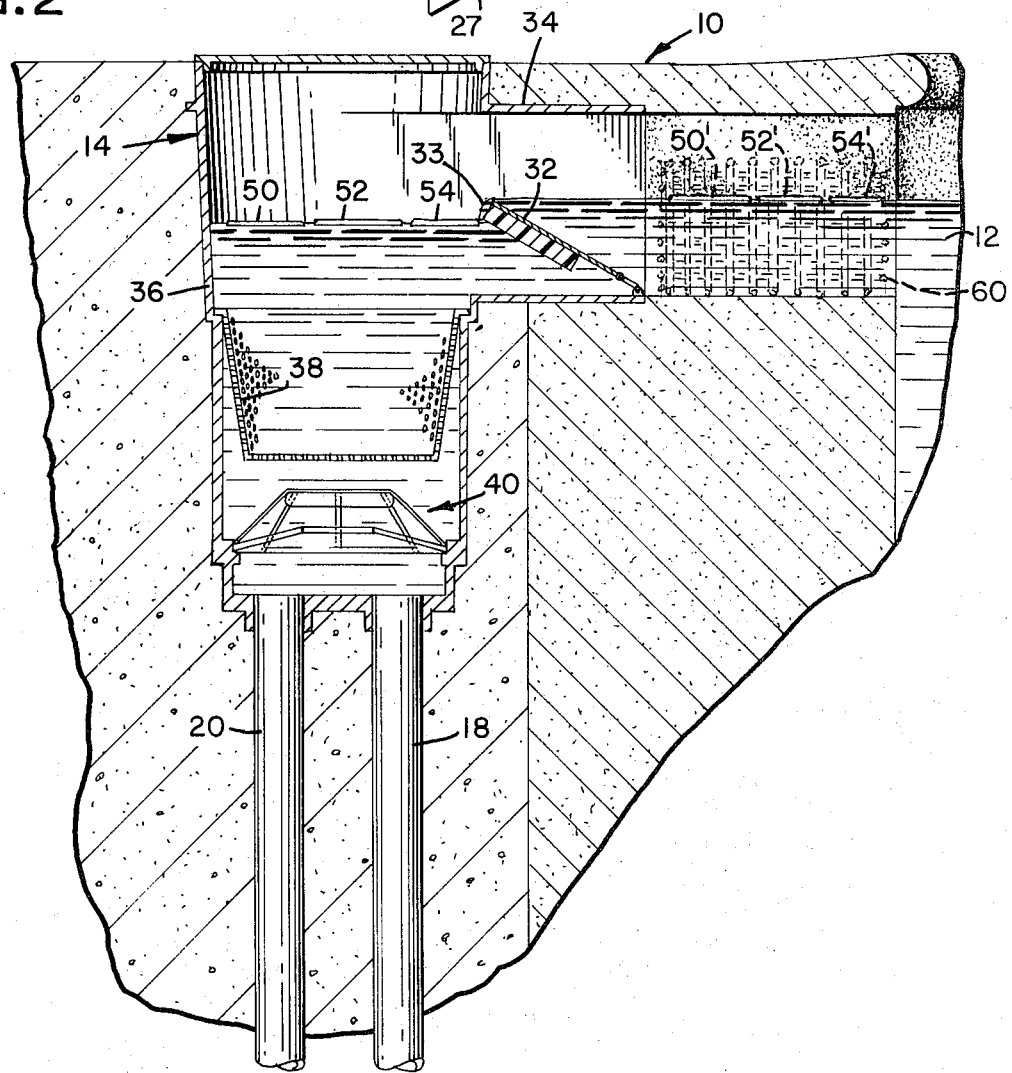
FIG. 2 is a cross section view of a strainer which is included in the water circulation system of FIG. 1.

FIG. 2 is a sectional view of the skimmer 14 which is mounted in a side wall of pool 10 at an upper edge thereof. The water from the surface of the water 12 in pool 10 continuously flows over the top of a floating weir 32 having a block of floatation material 33 secured to one side thereof and pivotally mounted in the opening of a throat 34 extending horizontally from the generally vertical cylindrical body 36 of skimmer 14. From throat 34 the water continuously flows into body 36 and into a perforated skimmer basket 38 mounted on a horizontal shoulder of the inner surface of body 36. The weir 32 further allows surges of water created by waves from swimming, diving or the like in the pool to enter the throat 34, but thereafter pivots in a clockwise direction on its hinge to prevent backwash of that water from the skimmer. The basket 38 traps relatively large size surface debris such as leaves, bugs, etc. Water flowing downward through basket 38 passes through a float valve assembly 40 and is then combined with the water flowing upward into the skimmer 14 from pipe 18 which is connected to the main drain. After being combined, the water flows downward out of the bottom of skimmer 14 through pipe 20 to pump 22, etc. Note that float valve assembly 40 would not be necessary in a skimmer being used in a pool of the types not having a main drain connection.

Shown in the area just to the left of floating weir 32 and above skimmer basket 38 are three pieces of oil absorbent material 50, 52 and 54 which have been dropped into the skimmer. The material is of the type that preferentially floats and absorbs oil such as that described in U.S. Pat. No. 3,630,891. The oil film floating on the top surface of the water is skimmed along with the water and skims over the top edge of floating weir 32. It then comes in contact with the pieces of oil absorbent material 50, 52 and 54 in its passage through the skimmer and is gradually completely absorbed after a number of circulations. Obviously, fewer or more than three pieces of material may be used.

The pivotal floatation action of the weir 32 captures the absorbent material 50, 52 and 54 within the cylindrical body 36, thus preventing wash-out of the absorbent material from the throat 34 and back into the pool. The weir 32, thus maintains the absorbent material at that location in the skimmer 14 where it will be the most effective in removing oil film from the water.

As the pieces of oil absorbent material become saturated, they are replaced, or squeezed out and reused. Although the absorbent pieces 50, 52 and 54 are shown uniformly spaced and positioned this is probably over simplified. There isn't much turbulence in the top of skimmer 14 but the spacing and orientation of absorbent pieces 50, 52 and 54 are most likely random and irregular with some of the pieces on the surface and some at least partially below the surface of the water in skimmer 14.

Placement of the absorbent material 50, 52 and 54 upstream of the skimmer basket 38, further insures against drawthrough of the absorbent material into the circulation system which could result in clogging of the system. If through carelessness or forgetfulness the absorbent material is allowed to remain in the skimmer 14 past its useful life, or to become water-logged or the like, it will be harmlessly collected by the skimmer basket 38 for removal upon cleaning of the basket.

While the weir configuration illustrated in FIG. 2 is found to be the most effective, popular and common, applicants' invention can also be employed with other weir configurations. One such alternate configuration (not shown) is an elongate cylindrical weir which fits down into the skimmer basket. Another alternate configuration (not shown) is an elongate cylindrical weir that internally holds the skimmer basket. In such alternate weir configurations, the absorbent material would be placed within their hollow cylindrical centers such that all of the water passing through the skimmer would contact the material.

Although it is very effective and convenient to place the material in the skimmer it may be placed at other points in the system for circulating the water and still be effective. An example of an alternate positioning of the absorbent material 50, 52 and 54 is illustrated in dashed lines in the passageway leading to the skimmer 14 in FIG. 2. A cage-like container 60 is employed to retainably hold the material at the position illustrated, for preventing wash-out of the materials back into the pool, and is positioned adjacent the water surface for maximizing oil absorption thereby. Material placement positions other than those shown which would accomplish the above purposes, are also within the spirit and intent of this invention.

What is claimed is:

1. In combination with a pool having a recirculating filter system including an entrance passage thereinto, a pump, and a strainer basket between said passage in said pump, the improvement comprising pads preferentially absorptive of oil and floatable upon the surface of water, said pads being located in said entrance passage and upstream of said strainer basket, whereby oil floating on the surface of water being recirculated through said filter system is absorbed from the surface thereof by said pads floating on said surface.

2. The structure of claim 1 in which the total perimeter of the pads is large compared with the perimeter of a single pad having their total area.

3. The method of removing oil from the surface of a body of water in a pool having a recirculating filter system including an entrance passage thereinto, a pump, and a strainer basket between said passage and said pump, said method comprising the step of locating pads preferentially absorptive of oil and floatable upon the surface of water within the entrance passage on the side of the basket waay from the pump, whereby oil floating on the surface of the water flowing through the passage is absorbed by said pads.

4. The method of claim 3 in which the total perimeter of the pads is large compared with the perimeter of a single pad having their total area.

* * * * *